US009773346B1

(12) United States Patent
Baldwin

(10) Patent No.: US 9,773,346 B1
(45) Date of Patent: Sep. 26, 2017

(54) DISPLAYING THREE-DIMENSIONAL VIRTUAL CONTENT

(71) Applicant: Amazon Technologies, Inc., Reno, NV (US)

(72) Inventor: Leo Benedict Baldwin, San Jose, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 201 days.

(21) Appl. No.: 13/797,129

(22) Filed: Mar. 12, 2013

(51) Int. Cl.
*H04N 13/02* (2006.01)
*G06T 19/00* (2011.01)

(52) U.S. Cl.
CPC ........... *G06T 19/00* (2013.01); *H04N 13/021* (2013.01)

(58) Field of Classification Search
CPC ............ H04N 13/0055; H04N 13/0021; G06T 19/00; G06T 19/003
USPC ........................................................ 348/50
See application file for complete search history.

(56) References Cited

U.S. PATENT DOCUMENTS

| | | | |
|---|---|---|---|
| 8,854,393 B2* | 10/2014 | Ishige et al. .................. 345/619 |
| 2010/0045666 A1* | 2/2010 | Kornmann et al. ........... 345/419 |
| 2010/0188426 A1* | 7/2010 | Ohmori et al. ............... 345/660 |
| 2011/0216002 A1* | 9/2011 | Weising et al. ............... 345/158 |
| 2011/0227945 A1* | 9/2011 | Ishige et al. .................. 345/633 |
| 2012/0038549 A1* | 2/2012 | Mandella et al. ............ 345/156 |
| 2012/0154378 A1* | 6/2012 | Kitchens ............ H04N 13/0468 345/419 |
| 2012/0242656 A1* | 9/2012 | McArdle ................. G06T 15/20 345/419 |
| 2013/0016102 A1* | 1/2013 | Look et al. .................... 345/426 |
| 2013/0050499 A1* | 2/2013 | Siklossy et al. .............. 348/169 |
| 2013/0215230 A1* | 8/2013 | Miesnieks et al. ............. 348/46 |
| 2013/0257907 A1* | 10/2013 | Matsui .......................... 345/633 |
| 2014/0104316 A1* | 4/2014 | Sharma et al. ............... 345/633 |
| 2014/0176591 A1* | 6/2014 | Klein et al. ................... 345/589 |
| 2014/0225919 A1* | 8/2014 | Kaino et al. .................. 345/633 |

* cited by examiner

*Primary Examiner* — Francis G Geroleo
(74) *Attorney, Agent, or Firm* — Polsinelli LLP

(57) ABSTRACT

A computing device can determine its position relative to a reference point. The device can render a portion of content too large to be suitably displayed in full on a display of the device. The device can render the content in full to appear (i.e., can virtually position the entire content) to be located in a stationary position relative to the reference point. The device can detect a change to its position, such as a movement of the device caused by a user of the device. Based on the detected change to the device's position, the device can modify which portion of the entire content to render. The rendered portion of the entire content can change corresponding to where and how the device moves.

26 Claims, 9 Drawing Sheets

DISPLAYING THREE-DIMENSIONAL VIRTUAL CONTENT

BACKGROUND

Computing devices are becoming more commonplace and are used for a wide variety of purposes. Every day, people use applications on their computing devices to view, access, and/or interact with various types of content, especially as mobile computing devices and applications are growing in number and in function. A user of a computing device can utilize the computing device to view webpages, view images, play games, participate in educational programs, and to perform other tasks. In some cases, applications can render content to be displayed on a display screen of the computing device. However, content that is static or less interactive, such as an image or text, can be boring to view, manipulate, or otherwise utilize. An improved approach to providing content on computing devices can be beneficial and can enhance the overall user experience associated with using computing devices to interact with content.

BRIEF DESCRIPTION OF THE DRAWINGS

Various embodiments in accordance with the present disclosure will be described with reference to the drawings, in which.

DETAILED DESCRIPTION

Figure 1:
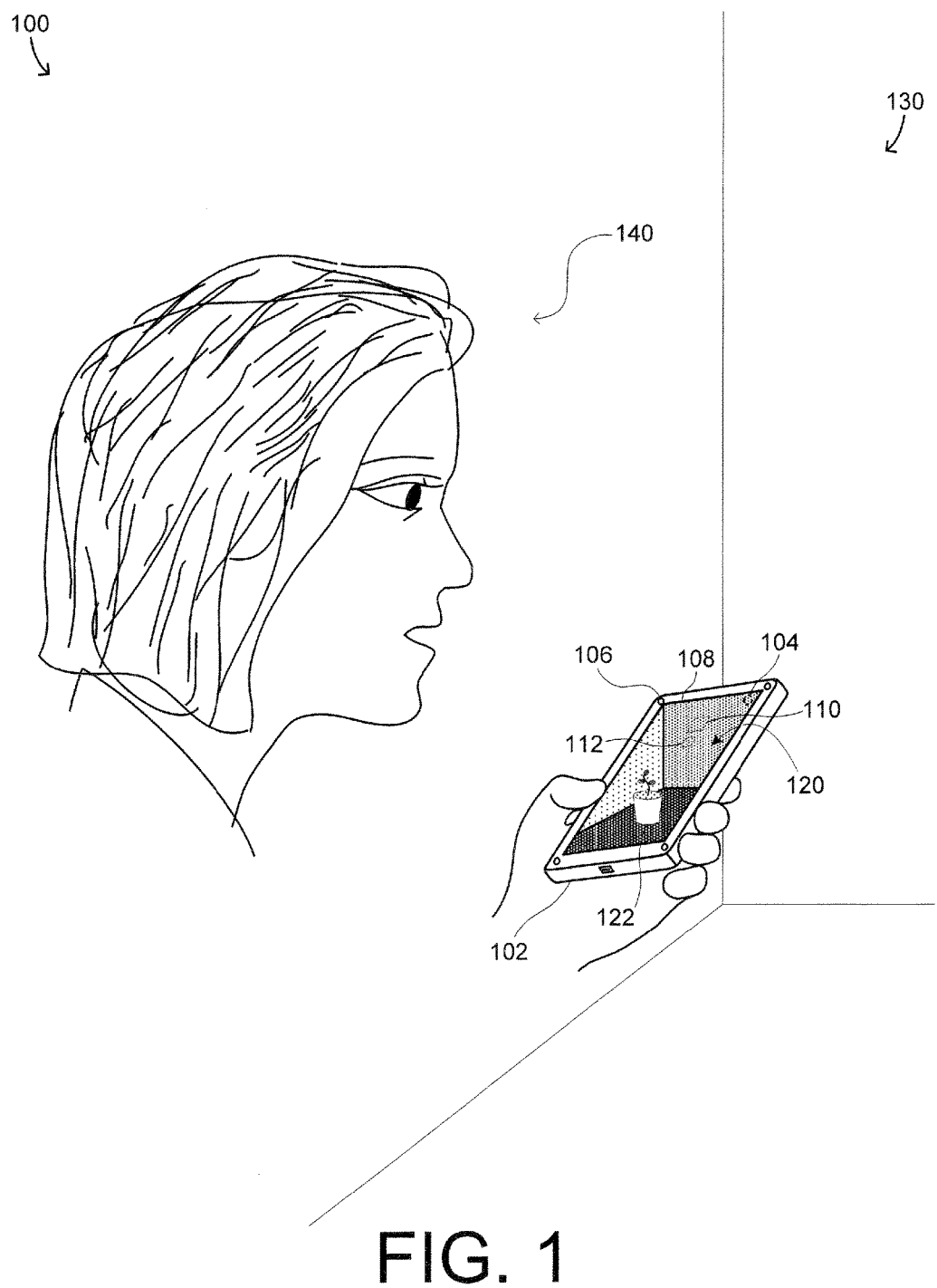
FIG. 1 illustrates an example environment in which aspects of the various embodiments can be utilized.

Systems and methods in accordance with various embodiments of the present disclosure overcome one or more of the above-referenced and other deficiencies in conventional approaches to interacting with content provided by a computing device. In particular, various embodiments of the present disclosure can provide an approach to displaying three-dimensional virtual content via a computing device based, at least in part, on detecting one or more movements of the computing device and/or movements of a user who is using the computing device.

At least some embodiments enable a computing device to generate a virtual environment. The virtual environment can be displayed in three-dimensions on a display of the computing device. As the computing device is moved around, such as by a user of the device, the virtual environment can be displayed to appear stationary with respect to one or more reference points. As such, the user can utilize the computing device to generate, display, interact with the virtual environment for a wide variety of purposes including (but not limited to) purposes of education, entertainment, and communication.

In some embodiments, the computing device can use one or more sensors to capture information about a reference point. In some cases, the device can use a camera to capture images including the reference point. The reference point can be, for example, a physical object in a physical environment (including a portion of the physical environment) in which the computing device is situated. In one example, a portion of a physical floor in the physical environment of the device can be used as a reference point. The computing device can determine its position relative to the reference point using the one or more sensors. The computing device can also determine a change to its position relative to the reference point using the one or more sensors. For example, if the device is moved by the user, the camera can capture images including the reference point and compare the images with previously captured images of the reference point to determine how the device has changed its position relative to the reference point. The virtual environment can be displayed to appear stationary with respect to the reference point. When the device moves, the displaying of the virtual environment can be modified such that the virtual environment appears to remain stationary relative to the reference point during the movement of the device.

Moreover, in some embodiments, the user of the computing device can change his head position relative to the computing device. Using the one or more sensors, such as at least one front-facing camera, the computing device can determine or track the change in the user's head position. Based on the change in the user's head position, the displaying of the virtual environment can be modified such that the virtual environment can appear to remain stationary relative to the reference point when the user changes his head position.

Furthermore, the present disclosure can enable one or more computing devices to communicate amongst one another to run one or more interconnected virtual environments or to operate multiple separate virtual environments. Various other functions and advantages are described and suggested below as may be provided in accordance with the various embodiments.

FIG. 1 illustrates an example environment 100 in which aspects of the various embodiments can be utilized. The example environment 100 can comprise a computing device 102, which can include one or more sensors. For example, the one or more sensors can include one or more cameras, such as at least one rear-facing camera 104 and/or at least one front-facing camera 106. The one or more sensors can also include a touch sensor, which can work in conjunction with a display 108 (e.g., forming a touch display). The computing device 102 can further include one or more geolocation sensors 110, orientation sensors 112, light sensors, audio sensors, etc. In some embodiments, the one or more geolocation sensors 110 can include a global positioning system (GPS) sensor and/or a radio signal multilateration sensor (e.g., configured for cellular triangulation), etc. In some embodiments, the one or more orientation sensors 112 can include a gyroscope, an accelerometer, a magnetometer, and/or an electric compass, etc.

Various embodiments of the present disclosure enable the computing device 102 to generate and present, via the display 108, a virtual environment 120. In some embodiments, the virtual environment 120 can include one or more virtual objects 122. The virtual environment 120, as well as any virtual objects (e.g., 122) included, can be rendered to appear in three dimensions on the display 108, thereby resulting in a three-dimensional virtual environment (e.g., 120) and three-dimensional virtual objects (e.g., 122).

The virtual environment 120 (and any included virtual objects, e.g., 122) can be generated to appear different from the actual, physical environment 130 in which the computing device 102 is situated. In some embodiments, virtual environments can be generated, at least in part, from one or more scanned images of physical environments, such as famous landmarks, renowned architectural works, etc. In some embodiments, virtual environments can be generated, at least in part, from one or more models of imaginary environments created by artists and other model makers. It is also contemplated that any combination of representations of physical environments and/or imaginary environments can be utilized to create virtual environments.

For example, as shown in FIG. 1, the computing device 102 can be physically and actually situated in an empty room with blank walls (130). However, in the example, the virtual environment 120 displayed on the device 102 can correspond to a room or environment different from the physical environment 130 in which the device 102 is actually situated. Moreover, as shown in the example of FIG. 1, the empty room 130 does not actually contain any objects or items. Yet the displayed virtual environment 120 can include one or more virtual objects, such as a flower pot 122, as shown on the display screen 108 of the computing device 102.

In some embodiments, the virtual environment 120 displayed on the computing device 102 can be "fixed" to a reference point. In other words, the virtual environment 120 can be displayed on the device 102 to appear as if the virtual environment 120 can remain stationary relative to the reference point. Accordingly, when the device 102 is moved, such as by a user 140 of the device 102, the displayed view or perspective of the virtual environment 120 can be modified to make the virtual environment 120 appear stationary with respect to the reference point during the move. It is also contemplated that there can be a plurality of reference points. In some cases, the virtual environment 120 can be displayed to appear stationary with respect to multiple reference points.

In some embodiments, a reference point can include any physical object in the physical environment (e.g., 130) in which the computing device 102 is situated or at least a portion of the physical environment (e.g., 130). For example, a ground or floor, a wall, a ceiling, or another physical object or portion of the physical environment can each serve as a reference point. In some cases, patterns, markings, and/or other identifiable portions of a physical object can be used as reference points. In one example, a special or unique textural pattern found on a wall can serve as a reference point.

Furthermore, a convenient approach can be to set (a portion of) the floor or ground of the physical environment 130 to be a reference point. For example, the virtual environment 120 can be displayed such that the floor or ground of the virtual environment 120 corresponds to the floor or ground of the physical environment 130.

In order to set the reference point(s), the computing device 102 can utilize its one or more sensors to capture information about the reference point(s). In one example, at least one rear-facing camera 104 of the device 102 can be utilized to capture one or more images. The reference point, such as a wall, floor, or another physical object, can be included in the captured images. From the captured images, a reference point can be selected and a position of the reference point can be determined. Further, based on the position of the reference point in the images and/or the current location/orientation of the device 102, a relative position of the device 102 with respect to the reference point can be determined as well. Moreover, when the position of the device 102 changes, images including the position of the reference point can be captured again (and/or orientation/location information about the device 102 can be updated) and the change to the relative position of the device 102 can be determined. Based, at least in part, on the position of the reference point and/or the change in relative position of the device 102, a determination can be made as to how to display the virtual environment 102 such that the virtual environment 102 appears to remain stationary with respect to the reference point when the device 102 changes its position.

Additionally or alternatively, at least one front-facing camera 106 of the device 102 can be utilized as well. For example, the at least one front-facing camera 106 can also capture images including a reference point(s) such that a change to the relative position of the device 102 can be determined (e.g., based on the reference point position(s) in the captured images and/or orientation/location information about the device 102). In another example, the at least one front-facing camera 106 can be used to determined and/or track changes in a head position of the user 140. As such, if the device 102 is kept stationary, but the user's head position changes, the displaying of the virtual environment 120 can be modified such that the environment 120 still appears stationary relative to the reference point(s) while the user 140 changes his head position. It also follows that, based on the changes in the head position of the user 140 and/or on changes to the relative position of the device 102, the virtual environment 120 can be displayed to appear stationary on the display 108 with respect to the reference point(s) when the device 102 is moved and/or when the user 140 moves his head relative to the device 102.

Furthermore, in some embodiments, the reference point can be a position, orientation, and/or location of the computing device 102 relative to absolute space. For example, the reference point can correspond to a combination of the current GPS coordinates of the device 102 and the current directions or degree angles in which the device 102 is turned (relative to a device vertical axis), tilted (relative to a device horizontal axis), and twisted (relative to a device depth axis).

In one example, the user 140 can choose to download (e.g., through a purchase) a particular virtual environment from a plurality of virtual environments. The virtual environments can be created by software developers, artists, or other entities. Some virtual environments can be educational, such as a virtual museum environment or a virtual historical site. Some virtual environments can be for entertainment purposes, such as a virtual tourist attraction or a virtual sports arena. A person having ordinary skill in the art would recognize various uses and/or purposes for virtual environments within the scope of the present disclosure.

Figure 2:
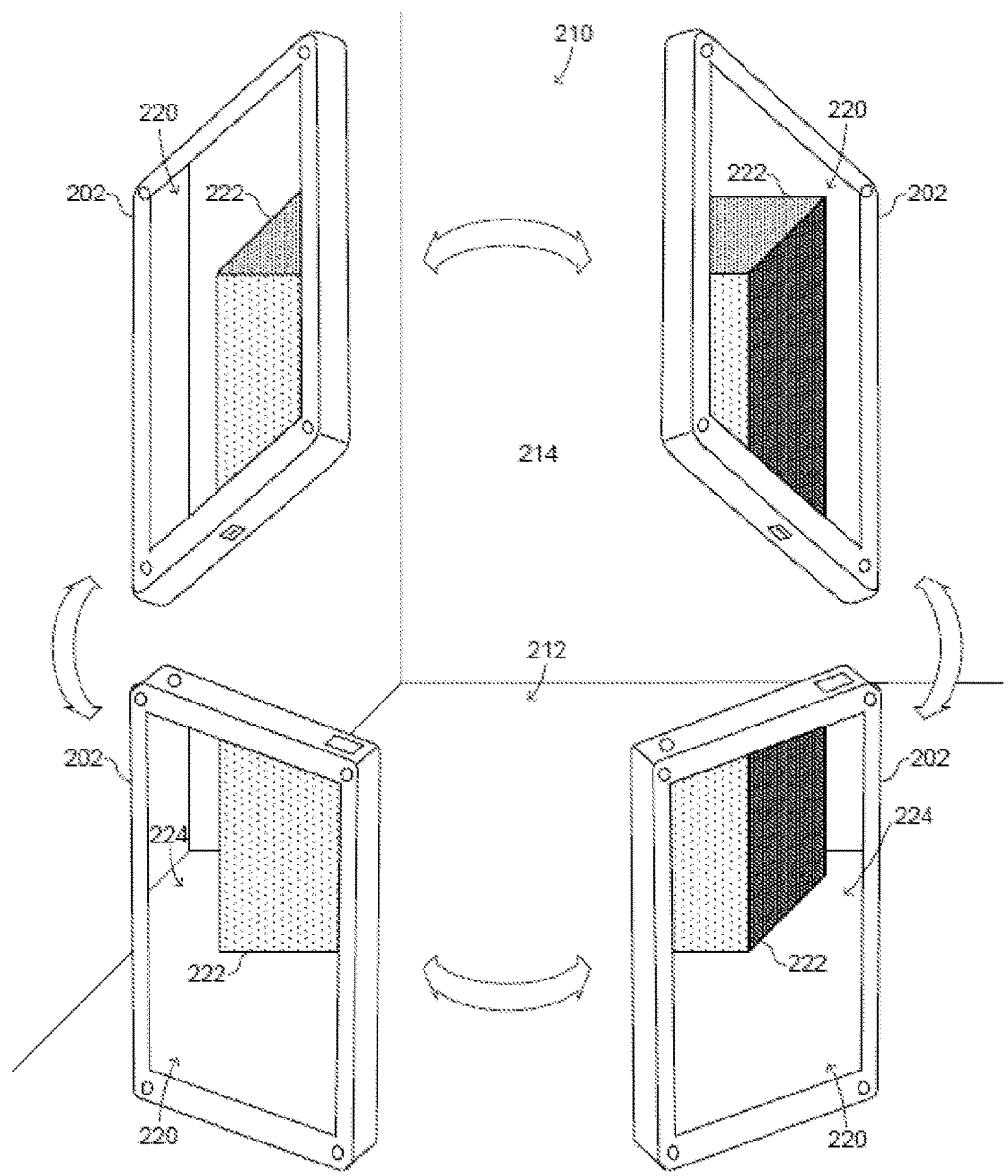
FIG. 2 illustrates an example device embodiment for displaying three-dimensional virtual content.

Referring now to FIG. 2, an example device embodiment 202 for displaying three-dimensional virtual content is illustrated. In FIG. 2, the example computing device embodiment 202 is shown at four different positions (i.e., locations, and/or orientations, etc.). The four example positions of the computing device 202 attempt to illustrate various movements that can occur with respect to the device 202. For example, a user (not shown in FIG. 2) of the computing device 202 can move the device 202 from one position to another, back again, and so forth.

In the example of FIG. 2, the physical and actual environment 210 in which the device 202 is situated can be an empty room with blank walls. A virtual environment 220 can be generated and displayed on the computing device 202. The (three-dimensional) virtual environment 220 can also include a (three-dimensional) virtual object 222. As shown in the example of FIG. 2, the virtual environment 220, as well as the virtual object 222, can be displayed to appear stationary with respect to a reference point.

In one example, the floor 212 of the empty room 210 can be used as a reference point and can be "synced" to the floor 224 of the virtual environment 220. As such, the user of the device 202 can hold the device 202, walk around the room 210, and move his device 202 to "explore" the virtual environment 220 (i.e., to see different views or perspectives of the virtual environment 220 and virtual object 222, to view the virtual environment 220 and virtual object 222 from various angles and viewpoints, etc.). Since the floor 212 of the room 210 is synced with the floor 224 of the virtual environment 220, the virtual object 222 on the virtual floor 224 can be displayed on the device 220 to appear as if the object 222 were sitting on the physical floor 212 of the empty room 210.

Continuing with the example, as shown in FIG. 2, when the user moves the device 202 to the left lower area in the front of the room 210 (i.e., as shown in the left bottom position of device 202 in FIG. 2), the user can see the left lower area of the front side of the virtual object 222 (and of the virtual environment 220). Similarly, the user can see the right lower area of the front of the virtual object 222 (and environment 220) when he moves the device 202 to the right lower area in the front of the room 210 (i.e., right bottom position of device 202 in FIG. 2). Likewise, the user can see the left upper area of the front of the virtual object 222 when he moves the device 202 to the left upper area in the front of the room 210 (i.e., left top position of device 202 in FIG. 2). It also follows that the user can see the right upper area of the front of the virtual object 222 when he moves the device 202 to the right upper area in the front of the room 210 (i.e., right top position of device 202 in FIG. 2).

Moreover, although not shown in FIG. 2, if the user walks to the back (e.g., 214) of the room 210 and turns his device 202 such that the display of the device 202 is facing toward the back wall (e.g., 214) of the room 210, the user should be able to view the back side of the virtual object 222.

Figure 3:
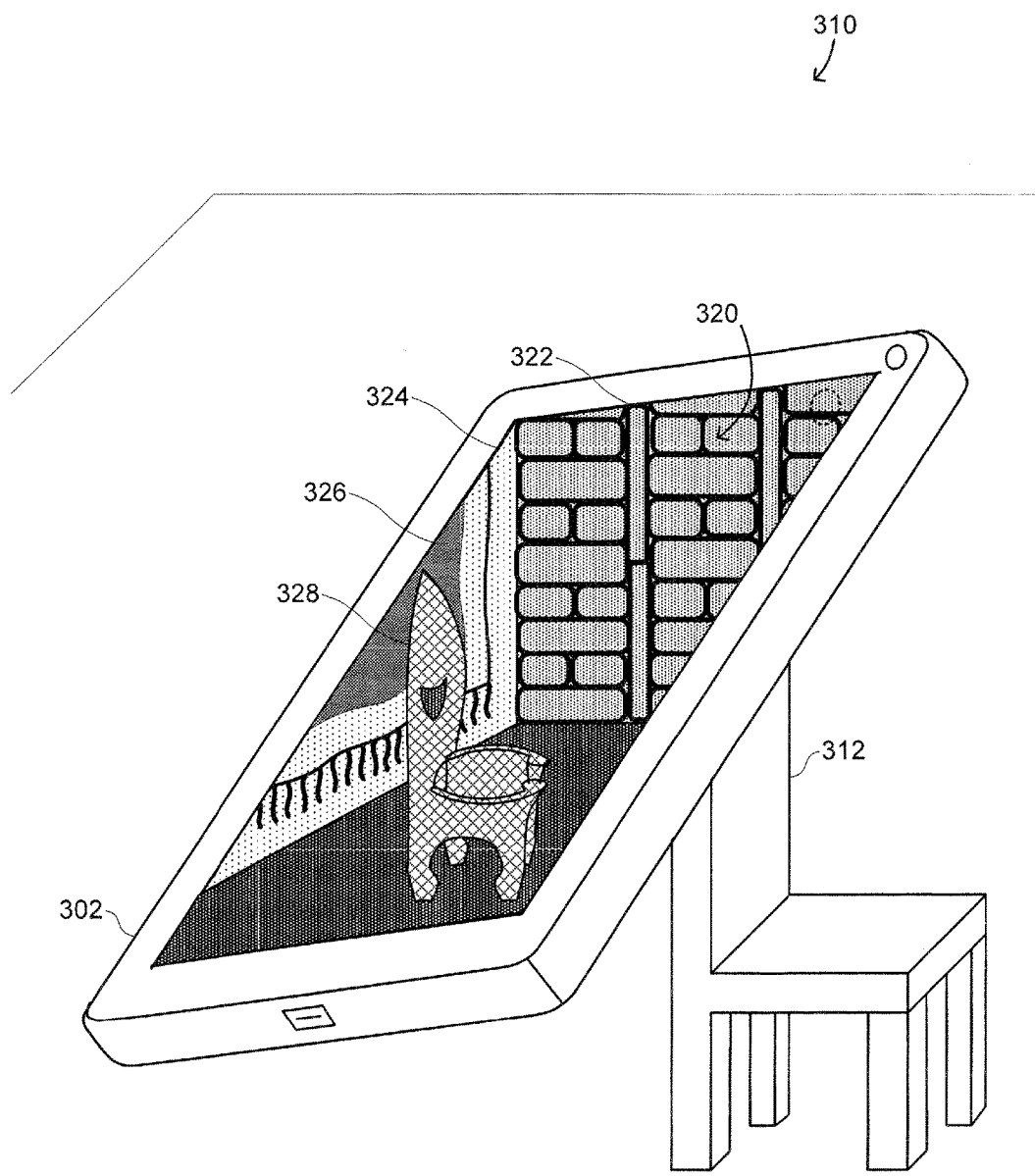
FIG. 3 illustrates an example device embodiment for displaying three-dimensional virtual content.

FIG. 3 illustrates an example device embodiment 302 for displaying three-dimensional virtual content. In the example of FIG. 3, the computing device embodiment 302 can be configured to display a virtual environment in the form of a room in a medieval castle 320. This virtual environment 320 can not only be used for educational purposes to teach history, literature, art, etc., but the virtual medieval castle room 320 can also be used for entertainment (e.g., to function as an environment for playing games) and other purposes.

In this example, the physical environment 310 of the computing device 302 can be a large, open field. The walls, ceilings, or boundaries other than the ground of the open field 310 are outside the field(s) of view of the camera(s) of the device 302. In this example, the virtual medieval castle room 320 can be displayed to appear stationary with respect to a portion of the field's floor. In other words, (a portion of) the floor of the open field 310 can serve as a reference point for displaying the virtual medieval castle room 320 and keeping the room 320 stationary.

Continuing with the example, it is important to note that the virtual castle room 320 can include walls and/or other objects that are virtual and not present in the physical environment 310. In FIG. 3, the virtual castle room 320 can include a virtual back wall 322 made of stone, which has no corresponding counterpart in the physical open field 310. There can also be a left wall 324 in the virtual room 320 that does not exist in the open field 310. Moreover, one or more other virtual objects, such as a wall decoration 326, can be included in the virtual environment 320, but not in the physical environment 310 in which the device 302 is actually situated. As such, in some cases, virtual environments can be generated independent of the layout of the physical environments in which computing devices are situated.

In some embodiments, when a user (not shown in FIG. 3) of the device 302 is exploring or otherwise interacting with the virtual environment 320, the user can encounter a physical object (e.g., a chair) 312 in the physical environment 310 that is not initially present or not originally designed to be present in the virtual environment 320. As such, the user can accidentally or unintentionally bump into the physical object 312, for example, if he is too engaged with the virtual environment 320 and does not see the physical object 312.

To address this potential issue, the computing device 302 can detect the physical object 312 (e.g., using a rear-facing camera in conjunction with image processing, edge detection, feature detection, object recognition, face recognition, etc.) and display a virtual representation 328 of the physical chair 312, such that the virtual representation 328 is present at a location in the virtual environment 320 corresponding to the location of the physical chair 312 in the physical environment 310. In some embodiments, the virtual representation 328 can be generated to match a context (e.g., style, theme, time period, etc.) of the virtual environment 320. In FIG. 3, the virtual chair 328, generated for the physical chair 312, can be a medieval castle chair to match the virtual medieval castle room 320. As such, the user will be less likely to unintentionally walk or bump into the physical chair 312 because the user can notice the virtual castle chair 328 at a location in the virtual castle room 320 corresponding to the location of the physical chair 310 in the open field 310. Moreover, in some embodiments, the virtual representation for the physical object does not necessarily have to be similar to the physical object. For example, regarding the physical chair 312, the virtual representation in the virtual castle room 320 does not have to be a chair as well, but can instead be a statue, a suit of armor, or some other item.

Figure 4:
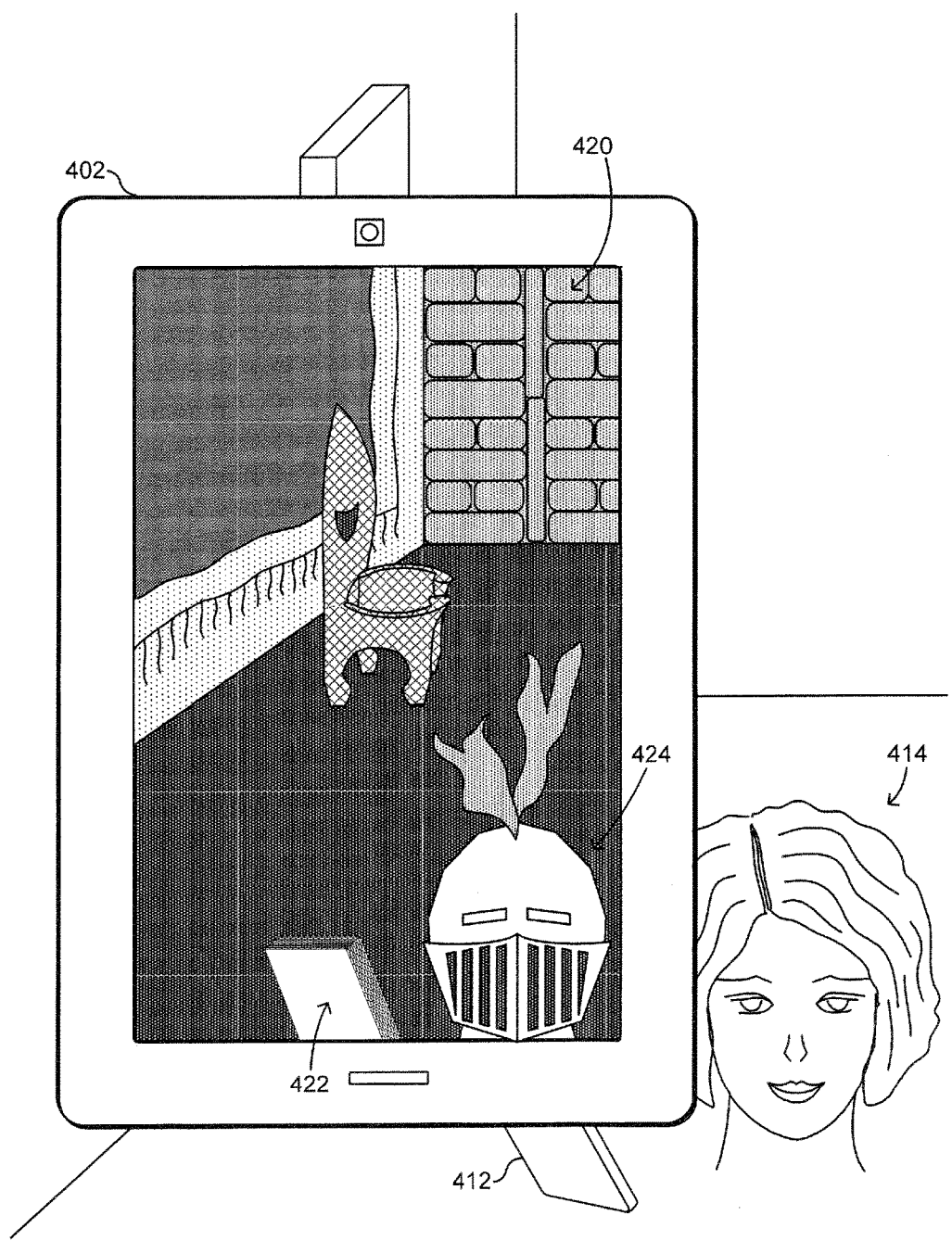
FIG. 4 illustrates an example device embodiment for displaying three-dimensional virtual content.

FIG. 4 illustrates an example device embodiment 402 for displaying three-dimensional virtual content. In some embodiments, the example computing device 402 can communicate with at least one other computing device (e.g., 412) and work in conjunction to cooperatively run a virtual environment 420, as shown in FIG. 4. For example, the computing device 402 can receive information about at least one second computing device (e.g., 412). The information can indicate at least one of a position of the second computing device 412 relative to the computing device 402, a position of the second computing device relative to the virtual environment 420, a position of a user (e.g., 414) of the second computing device relative to the second computing device, a preference, related to the virtual environment, of the user 414 of the second computing device, or other information.

In some embodiments, the computing devices 402 and 412 can work in conjunction to set a position of the virtual environment 420 relative to both computing devices. As such, the virtual environment 420 can appear to remain stationary as display on both devices 402 and 412. In some embodiments, the setting of the position can be based, at least in part, on the position of a first computing device (e.g., 402), one or more reference points, and at least one of the position of a second computing device (e.g., 412) relative to the first computing device, the position of the first computing device relative to the virtual environment, or the position of the second computing device relative to the virtual environment.

In some embodiments, device 402 and device 412 can be running separate (e.g., different) virtual environments. As such, the devices can communicate with one another to ensure that the virtual environment on each respective device does not interfere with the other. For example, the devices can communicate to manage the areas each respective user can explore such that the users do not bump into each other.

As discussed with reference to FIG. 3, a virtual representation (e.g., book 422) can be generated in the virtual environment 420 to correspond to computing device 412. Moreover, in some embodiments, a user (e.g., 414) of computing device 412, or another living entity (not shown in FIG. 4, e.g., a pet), can constitute a physical object that was not initially present or originally intended to be present in the virtual environment 420 displayed on computing device 402. As such, a virtual representation can be generated for the user 414 or other living entity. In some cases, the virtual representation can include an avatar 424 associated with the user 414 or other living entity. In one example, the virtual environment 420 can implement a policy specifying that all other human entities detected are to be virtually represented as knights. In another example, the user 414 can set a preference that she prefers her virtual representation to be generated as a knight avatar 424, as shown in FIG. 4. In some embodiments, using at least in part a camera and image processing techniques, the virtual representation for the user/entity can be displayed to mimic the actual user/entity and his/her/its actions.

In some embodiments, it is not necessary for the user 414 or other living entity to be using a computing device (e.g., 412). In other words, a virtual representation (e.g., avatar) for the living entity can be generated even if the entity is not using a computing device.

Figure 5A:
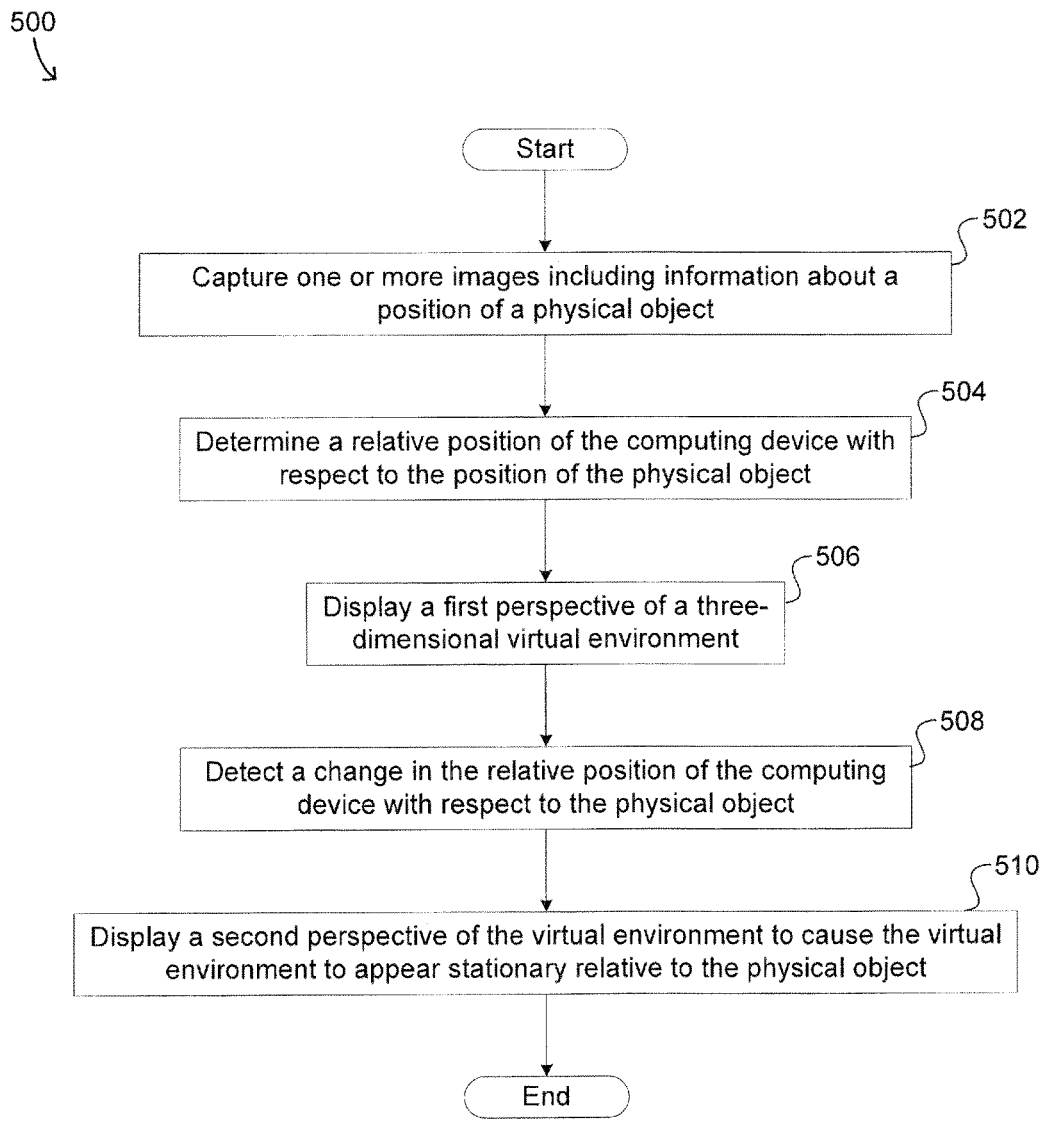
FIG. 5A illustrates an example method embodiment for displaying three-dimensional virtual content.

FIG. 5A illustrates an example method embodiment 500 for displaying three-dimensional virtual content. It should be understood that there can be additional, fewer, or alternative steps performed in similar or alternative orders, or in parallel, within the scope of the various embodiments unless otherwise stated. The example method embodiment 500 can start, at step 502, with capturing one or more images using at least one camera of the computing device. The one or more images can include information about a position of at least one physical object in an environment of the computing device. Step 504 can include determining a relative position of the computing device with respect to the position of the at least one physical object.

At step 506, the method 500 can display a first perspective of a three-dimensional virtual environment. The first perspective can be based, at least in part, on the relative position of the computing device with respect to the position of the at least one physical object. The method 500 can detect a change in the relative position of the computing device with respect to the at least one physical object, at step 508. The change can result at least in part from movement of the computing device. Step 510 can include displaying at least a second perspective of the three-dimensional virtual environment. The second perspective can be displayed to cause the virtual environment to appear to remain stationary in space, within an allowable deviation, with respect to the position of at least one physical object during the change in the relative position of the computing device.

Figure 5B:
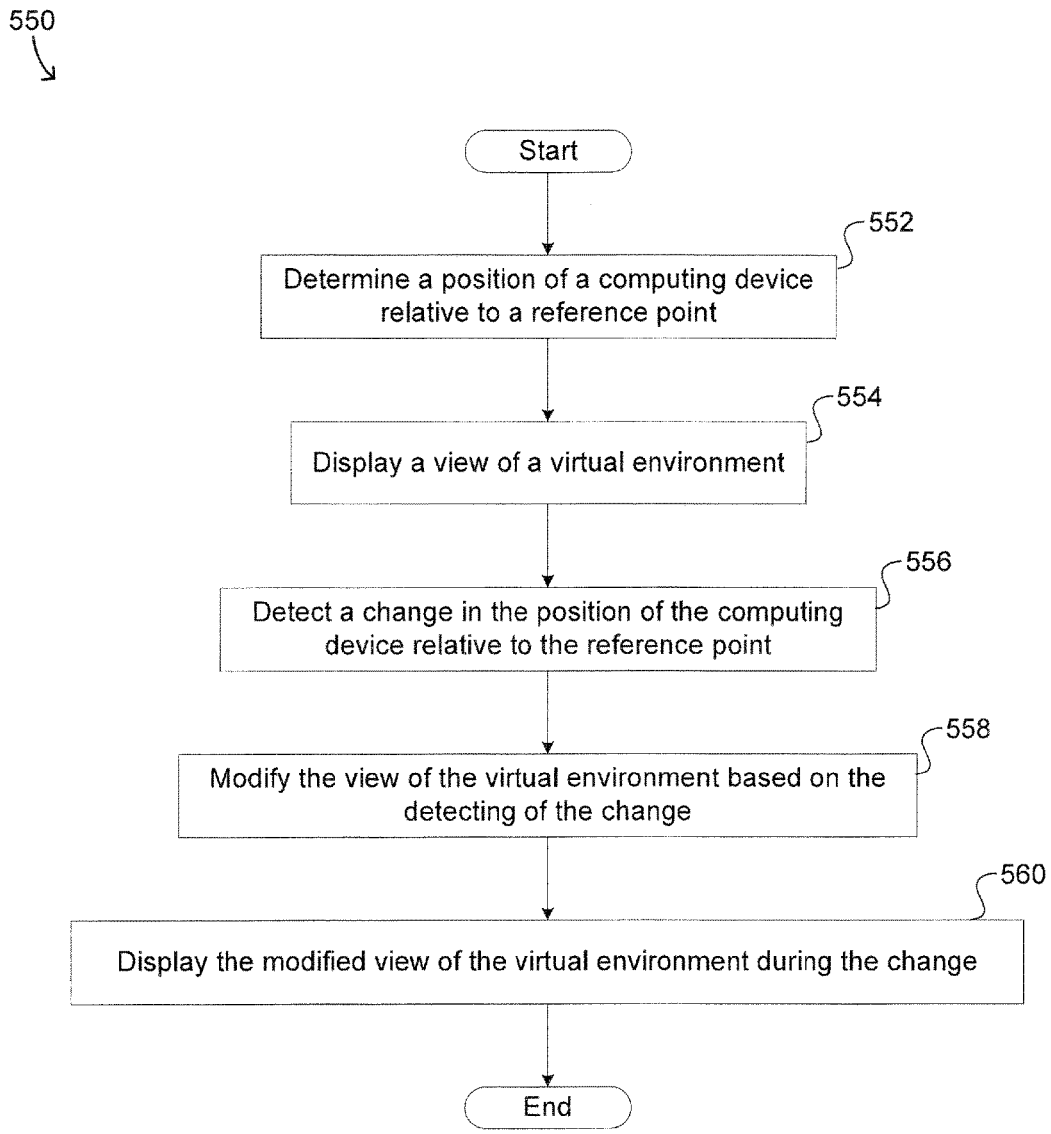
FIG. 5B illustrates an example method embodiment for displaying three-dimensional virtual content.

FIG. 5B illustrates an example method embodiment 550 for displaying three-dimensional virtual content. As mentioned above, it should be understood that there can be additional, fewer, or alternative steps performed in similar or alternative orders, or in parallel, within the scope of the various embodiments unless otherwise stated. At step 552, the example method embodiment 550 can start with determining a position of a computing device relative to a reference point using one or more sensors of the computing device. Step 554 can include displaying a view of a virtual environment. The view can be based, at least in part, on the position of the computing device relative to the reference point. Step 556 can include detecting, using the one or more sensors of the computing device, a change in the position of the computing device relative to the reference point.

At step 558, the method 550 can modify the view of the virtual environment based, at least in part, on the detecting of the change in the position of the computing device. The view can be modified to cause the virtual environment to appear stationary, within an allowable deviation, with respect to the reference point during the change in the position of the computing device. Step 560 can include displaying the modified view of the virtual environment during the change in the position of the computing device.

Figure 6:
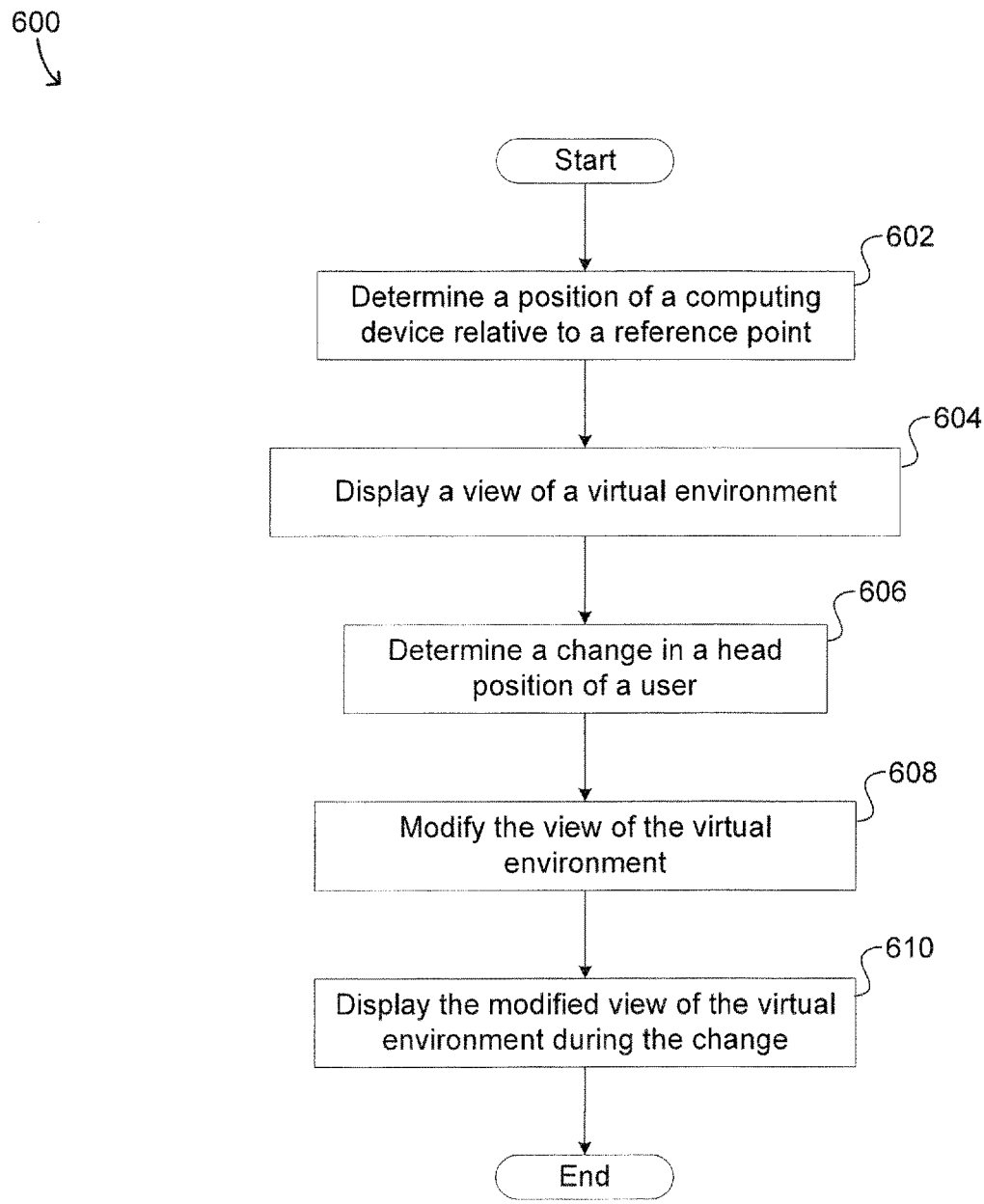
FIG. 6 illustrates an example method embodiment for displaying three-dimensional virtual content.

FIG. 6 illustrates an example method embodiment 600 for displaying three-dimensional virtual content. Again, it should be understood that there can be additional, fewer, or alternative steps performed in similar or alternative orders, or in parallel, within the scope of the various embodiments unless otherwise stated. At step 602, the example method embodiment 600 can determine a position of a computing device relative to a reference point using one or more sensors of the computing device. Step 604 can include displaying a view of a virtual environment. The view can be based, at least in part, on the position of the computing device relative to the reference point. Step 606 can include determining a change in a head position of a user of the computing device using at least one camera included in the one or more sensors of the computing device.

At step 608, the method 600 can modify the view of the virtual environment based, at least in part, on the determining of the change in the head position of the user. The view can be modified to cause the virtual environment to appear stationary, within an allowable deviation, with respect to the reference point during the change in the head position of the user. The method 600 can display the modified view of the virtual environment during the change in the head position of the user, at step 610.

In some embodiments, virtual environments can be downloaded from an information source. For example, virtual environments can be downloaded from a networked storage service. In another example, a user can select virtual environments to purchase from an electronic marketplace. In a further example, virtual environments can be stored and accessed from a memory device, such as a portable flash drive, a computing device hard disk, etc.

In some embodiments, data representing a virtual environment can be downloaded as needed. In other words, data representing a virtual environment can be streamed to a user's computing device as he is interacting with (e.g., walking through) the virtual environment. In some embodiments, there can be a cache or a buffer for storing virtual environment data that will likely be used soon. In some embodiments, predictions can be made as to which portions of virtual environment data will be needed soon.

In some embodiments, the modifying of the view of the virtual environment can further comprise blurring, at least partially, the view of the virtual environment when a confidence score associated with the detecting of the change of the position of the device and/or the head position of the user is below a confidence threshold. For example, if the device is unsure about the detecting of the change (e.g., cannot determine the change) to the device position and/or the user's head position, the display of the virtual environment can be blurred.

In some embodiments, the computing device can receive, from an information source such as a memory device or a network server, data representative of a physical environment in which the computing device is situated (e.g., currently situated, previously situated, etc.). The data can be analyzed to generate a virtual representation for at least a portion of the physical environment. In one example, the device can receive, from an online mapping service, data representing at least a portion of a map showing an area in which the device is located. A virtual representation of the area, as well as any physical objects included in the area, can be generated based, at least in part, on the data. The virtual representation of the area can correspond to the virtual environment.

In some embodiments, the computing device can determine that the displaying of the view of the virtual environment has occurred for a time period exceeding a specified time period threshold. In response, the device can disable (e.g., terminate, pause, lock out, minimize, etc.) the displaying of the view of the virtual environment. For example, a parent can enable an option for an automatic time-out of the virtual environment, such that the parent's child does not use, play, or otherwise interact with the virtual environment for longer than desired by the parent. In some cases, the user of the computing device can enable the automatic disabling of the virtual environment after a specified time period to prevent the user from spending too much time playing or otherwise interacting with the virtual environment.

Various embodiments consistent with the present disclosure can also be implemented for a zoom function. For example, the computing device can zoom in with respect to the view of the virtual environment being displayed when the change in the user's head position is determined to be directed toward a front face of the computing device, or the computing device can zoom out with respect to the view of the virtual environment being displayed when the change in the head position is determined to be directed away from the front face of the computing device. In some cases, the zoom function can be toggled (on and off) via a switch or instruction.

It is further contemplated that there can be many other uses and/or applications associated with the various embodiments of the present disclosure that a person having ordinary skill in the art would recognize.

Figure 7:
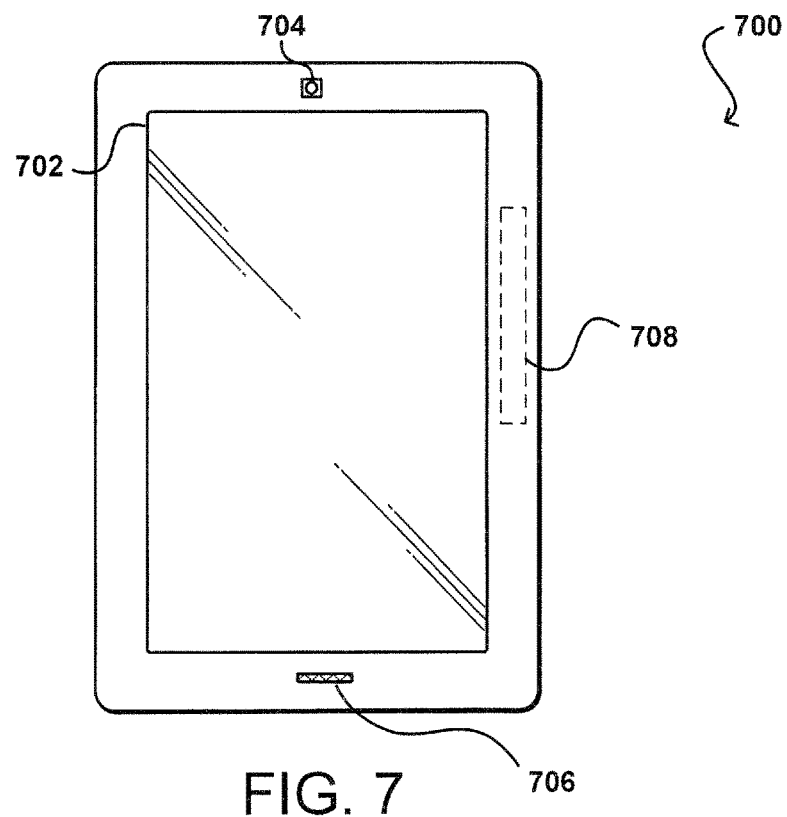
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
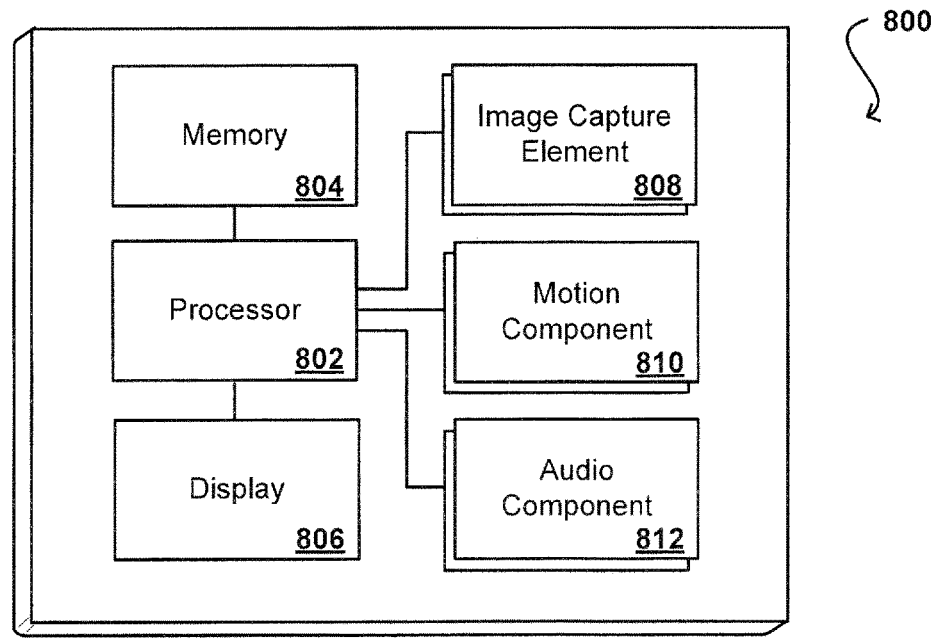
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
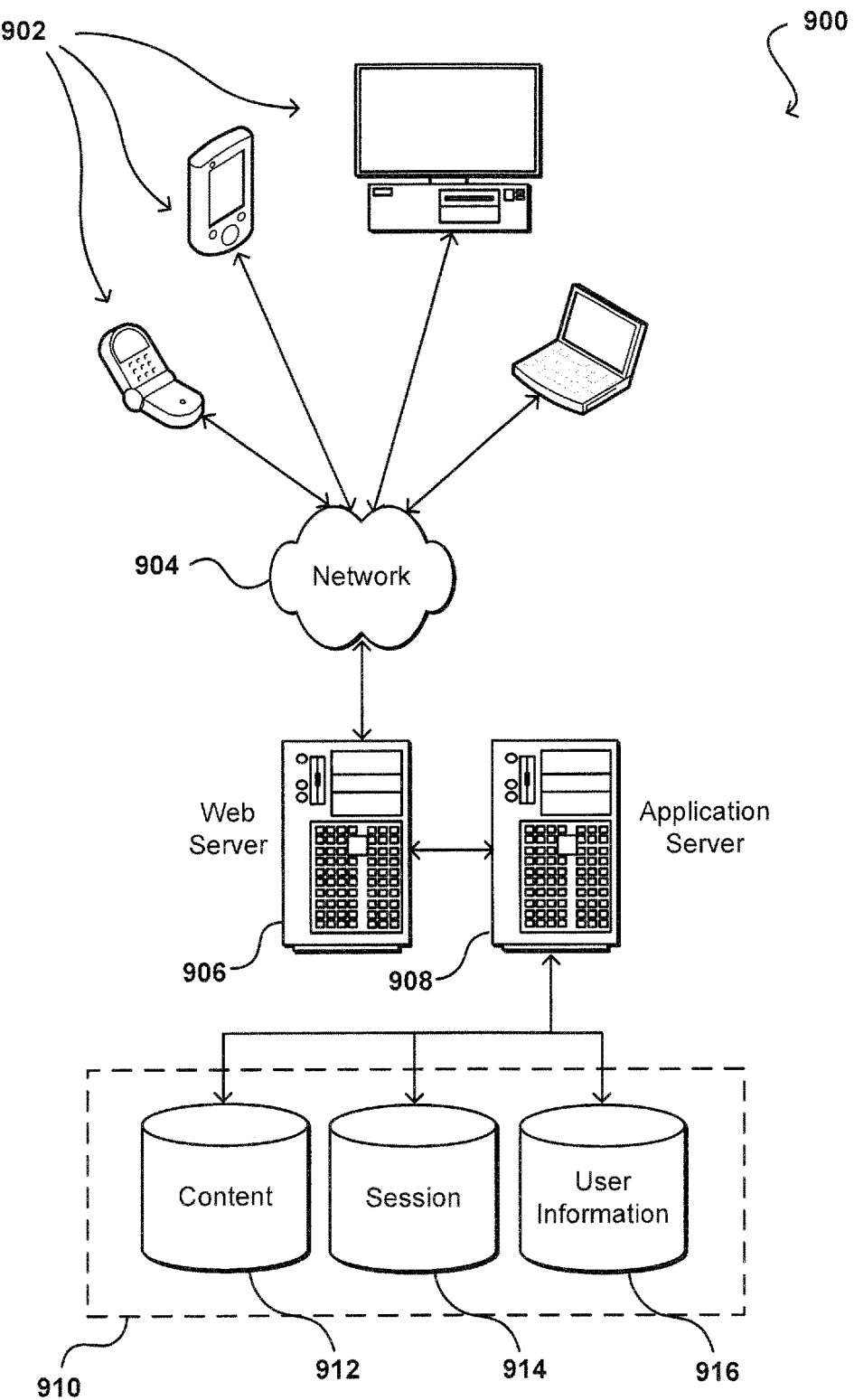
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for displaying virtual content, comprising:
   capturing one or more first images using at least one camera of a first computing device;
   determining a first position of the first computing device relative to a first reference point in a physical environment based at least in part on the one or more first images, the first reference point being shared between the first computing device and a second computing device;
   receiving a second position of the second computing device relative to the first reference point;
   displaying on a first display screen of the first computing device a first perspective of a virtual environment that is based at least in part on the first position and the second position;
   capturing one or more second images using the at least one camera;
   detecting a first change in position of the first computing device relative to a second reference point such that a first portion of the first computing device is closer to the second reference point and a second portion of the first computing device is further away from the second reference point based at least in part by comparing the one or more first images and the one or more second images, the second reference point corresponding to a head of a user within a field of view of the at least one camera;
   displaying on the first display screen a second perspective of the virtual environment that simulates virtual environment appearing to remain stationary in space relative to the second reference point during the first change in position;
   sending to the second computing device information indicative of the first change in position to cause the second computing device to display on a second display screen of the second computing device a third perspective of the virtual environment that simulates a movement of the first computing device corresponding to the first change in position and that simulates the virtual environment appearing to remain stationary in space relative to the first reference point during the first change in position;
   capturing one or third images using the at least one camera;
   detecting a second change in position of the first computing device relative to the second reference point such that the second portion of the first computing device is closer to the second reference point and the first portion of the first computing device is further away from the second reference point;
   displaying on the first display screen a fourth perspective of the virtual environment that simulates the virtual environment appearing to remain stationary in space relative to the second reference point during the second change in position; and
   sending to the second computing device information indicative of the second change in position to cause the second computing device to display on the second display screen a fifth perspective of the virtual environment that simulates a movement of the first computing device corresponding to the second change in position and that simulates the virtual environment appearing to remain stationary in space relative to the first reference point during the second change in position.

2. The computer-implemented method of claim 1, further comprising:
   capturing at least one first image, using at least one front-facing camera of the first computing device, the first image including a first representation of the head of the user;
   determining the first position based at least in part on a first head position represented in the first image;
   capturing at least one second image including a second representation of the head of the user; and
   determining the first change in position based at least in part on a second head position represented in the second image.

3. The computer-implemented method of claim 1, further comprising:
   receiving, from an information source, data representing the virtual environment; and
   generating the first perspective based at least in part on the data representing the virtual environment.

4. The computer-implemented method of claim 3, wherein the data representing the virtual environment is generated based at least in part on at least one of an image of at least a portion of the physical environment or a model of at least a portion of an imaginary environment.

5. A computer-implemented method comprising:
   determining a first position of a first computing device relative to a first reference point in a physical environment using one or more sensors of the first computing device, the first reference point being shared between the first computing device and a second computing device;
   receiving a second position of the second computing device relative to the first reference point;

displaying on a first display screen of the first computing device a first view of a virtual environment that is based at least in part on the first position and the second position;

detecting, using the one or more sensors, a first change in position of the first computing device relative to a second reference point such that a first portion of the first computing device is closer to the second reference point and a second portion of the first computing device is further from the second reference point, the second reference point corresponding to a head of a user;

displaying on the first display screen a second view of the virtual environment that simulates the virtual environment appearing to be stationary relative to the first reference point during the first change in position;

sending to the second computing device the first change in position to cause the second computing device to display on a second display screen of the second computing device a third view of the virtual environment that simulates a movement corresponding to the first change in position and that simulates the virtual environment appearing to be stationary relative to the first reference point during the first change in position;

detecting, using the one or more sensors, a second change in position of the first computing device relative to the second reference point such that the second portion of the first computing device is closer to the second reference point and the first portion of the first computing device is further from the second reference point; and displaying on the first display screen a fourth view of the virtual environment that simulates the virtual environment appearing to be stationary relative to the first reference point during the second change in position.

6. The computer-implemented method of claim 5, further comprising:
   detecting a physical object within a field of view of at least one rear-facing camera of the first computing device;
   determining a location in the virtual environment corresponding to where the physical object is located in the physical environment; and
   displaying a virtual representation of the physical object at the location in the virtual environment.

7. The computer-implemented method of claim 6, wherein the physical object includes a living entity, and wherein the virtual representation includes an avatar associated with the living entity.

8. The computer-implemented method of claim 5, further comprising:
   receiving, from an information source, data representing the virtual environment; and
   generating the first view of the virtual environment based at least in part on the data representing the virtual environment.

9. The computer-implemented method of claim 8, wherein the data representing the virtual environment is generated based at least in part on at least one of an image of at least a portion of the physical environment or a model of at least a portion of an imaginary environment.

10. The computer-implemented method of claim 5, further comprising:
    sending to the second computing device information indicative of the second change in position to cause the second computing device to display a fifth view of the virtual environment that simulates a movement corresponding to the second change in position and that simulates the virtual environment appearing to be stationary relative to the first reference point during the second change in position.

11. The computer-implemented method of claim 5, wherein the first reference point corresponds to at least one of a ground, a wall, a ceiling, or a physical object in the physical environment.

12. The computer-implemented method of claim 5, further comprising:
    determining that a confidence score associated with detecting the first change in position is below a confidence threshold; and
    generating the second view of the virtual environment based at least in part by blurring, at least partially, image data corresponding to the second view of the virtual environment.

13. The computer-implemented method of claim 5, wherein the virtual environment is selected from a plurality of virtual environments based, at least in part, on one or more user-initiated instructions.

14. The computer-implemented method of claim 5, wherein the virtual environment includes one or more virtual objects associated with a context of the virtual environment.

15. The computer-implemented method of claim 5, further comprising:
    receiving, from an information source, data representing the physical environment; and
    generating a virtual representation for at least a portion of the physical environment based at least in part on analyzing the data representing the physical environment.

16. The computer-implemented method of claim 5, further comprising:
    determining that the first view of the virtual environment has been displayed for a time period exceeding a specified time period threshold; and
    stopping display of the first view of the virtual environment.

17. The computer-implemented method of claim 5, further comprising:
    determining that at least one of the second computing device or a second user is within a field of view of at least one camera of the first computing device; and
    generating a representation of at least one of the second computing device or the second user as a portion of the first view of the virtual environment.

18. A computer-implemented method comprising:
    determining a first position of a first computing device relative to a first reference point in a physical environment using one or more sensors of the first computing device, the first reference point being shared between the first computing device and a second computing device;
    receiving a second position of the second computing device relative to the first reference point;
    displaying on a first display screen of the first computing device a first view of a virtual environment based at least in part on the first position and the second position;
    determining, using the one or more sensors, a first change in position of a second reference point relative to the first computing device such that a first portion of the first computing device is closer to the second reference point and a second portion of the first computing device is further from the second reference point, the second reference point corresponding to a head of a user;

displaying on the first display screen a second view of the virtual environment that simulates the virtual environment appearing to be stationary relative to the first reference point during the first change in position;

sending to the second computing device the first change in position to cause the second computing device to display on a second display screen of the second computing device a third view of the virtual environment that simulates a movement corresponding to the first change in position and that simulates the virtual environment appearing to be stationary relative to the first reference point during the first change in position;

determining, using the one or more sensors, a second change in position of the second reference point relative to the first computing device such that the second portion of the first computing device is closer to the second reference point and the first portion of the first computing device is further from the second reference point; and displaying on the first display screen a fourth view of the virtual environment that simulates the virtual environment appearing to be stationary relative to the first reference point during the second change in position.

19. The computer-implemented method of claim 18, further comprising:

increasing a scale associated with a view of the virtual environment when a change in position of the head of the user causes the head of the user to be closer to a front face of the first computing device; or decreasing the scale associated with the view of the virtual environment when the change in the position of the head of the user causes the head of the user to be further away from the front face of the first computing device.

20. The computer-implemented method of claim 18, further comprising:

determining that at least one of the second computing device or a second user is within a field of view of at least one camera of the first computing device; and generating a representation of at least one of the second computing device or the second user as a portion of the first view of the virtual environment.

21. A system comprising:

at least one processor; and at least one memory device including instructions that, upon being executed by the at least one processor, cause the system to:

determine a first position of a first computing device relative to a first reference point in a physical environment using one or more sensors of the first computing device, the first reference point being shared between the first computing device and a second computing device;

receive a second position of the second computing device relative to the first reference point;

display on a first display screen of the first computing device a first view of a virtual environment that is based at least in part on the first position and the second position;

detect, using one or more sensors of the first computing device, a first change in position of the first computing device relative to a second reference point such that a first portion of the first computing device is closer to the second reference point and a second portion of the first computing device is further from the second reference point, the second reference point corresponding to a head of a user;

display on the first display screen a second view of the virtual environment that simulates the virtual environment appearing to be stationary relative to the first reference point during the first change in position;

send to the second computing device the first change in position to cause the second computing device to display on a second display screen of the second computing device a third view of the virtual environment that simulates a movement corresponding to the first change in position and that simulates the virtual environment appearing to be stationary relative to the first reference point in the physical environment during the first change in position;

detect, using the one or more sensors, a second change in position of the first computing device relative to the second reference point such that the second portion of the first computing device is closer to the second reference point and the first portion of the first computing device is further from the second reference point; and display on the first display screen a fourth view of the virtual environment that simulates the virtual environment appearing to be stationary relative to the first reference point during the second change in position.

22. The system of claim 21, wherein the one or more sensors include at least one of a front-facing camera, a rear-facing camera, a light sensor, a gyroscope, an accelerometer, a magnetometer, an electric compass, a global positioning system sensor, a radio signal multilateration sensor, or an audio capture component.

23. The system of claim 21, wherein the instructions cause the system to further:

detect a physical object within a field of view of at least one rear-facing camera of the first computing device;

determine a location in the virtual environment corresponding to where the physical object is located in the physical environment; and generate a virtual representation of the physical object at the location in the virtual environment.

24. The system of claim 23, wherein the physical object includes a living entity, and wherein the virtual representation includes an avatar associated with the living entity.

25. A non-transitory computer-readable storage medium including instructions, the instructions when executed by a processor of a first computing device causing the first computing device to:

determine a first position of the first computing device relative to a first reference point in a physical environment using one or more sensors of the first computing device, the first reference point being shared between the first computing device and a second computing device;

receive a second position of the second computing device relative to the first reference point;

display on a first display screen of the first computing device a first view of a virtual environment that is based at least in part on the first position and the second position;

determine, using the one or more sensors, a first change in position of a second reference point relative to the first computing device such that a first portion of the first computing device is closer to the second reference point and a second portion of the first computing device is further from the second reference point, the second reference point corresponding to a head of a user;

display on the first display screen a second view of the virtual environment that simulates the virtual environment appearing to be stationary relative to the first reference point during the first change in position;

send to the second computing device the first change in position to cause the second computing device to display on a second display screen of the second computing device a third view of the virtual environment that simulates a movement corresponding to the first change in position and that simulates the virtual environment appearing to be stationary relative to the first reference point during the first change in position;

determine, using the one or more sensors, a second change in position of the second reference point relative to the first computing device such that the second portion of the first computing device is closer to the second reference point and the first portion of the first computing device is further from the second reference point; and display on the first display screen a fourth view of the virtual environment that simulates the virtual environment appearing to be stationary relative to the first reference point during the second change in position.

26. The non-transitory computer-readable storage medium of claim 25, wherein the instructions cause the first computing device to further:

increase a scale associated with a view of the virtual environment when a change in position of the head of the user causes the head of the user to be closer to a front face of the first computing device; or decrease the scale associated with the view of the virtual environment when the change in the position of the head of the user causes the head of the user is to be further away from the front face of the first computing device.

* * * * *